United States Patent
Garcia Molina et al.

(10) Patent No.: US 11,855,682 B2
(45) Date of Patent: Dec. 26, 2023

(54) RADIO SIGNAL DEVICE AND METHOD FOR FAST TIME AMBIGUITY RESOLUTION

(71) Applicant: ESA—European Space Agency, AG Noordwijk (NL)

(72) Inventors: Jose Antonio Garcia Molina, AG Noordwijk (NL); Stefan Wallner, AG Noordwijk (NL)

(73) Assignee: European Space Agency, AG Noordwijk (NL)

( * ) Notice: Subject to any disclaimer, the term of this patent is extended or adjusted under 35 U.S.C. 154(b) by 0 days.

(21) Appl. No.: 17/759,916

(22) PCT Filed: Feb. 12, 2020

(86) PCT No.: PCT/EP2020/053581
§ 371 (c)(1),
(2) Date: Aug. 1, 2022

(87) PCT Pub. No.: WO2021/160256
PCT Pub. Date: Aug. 19, 2021

(65) Prior Publication Data
US 2023/0065422 A1 Mar. 2, 2023

(51) Int. Cl.
*H04B 1/7075* (2011.01)

(52) U.S. Cl.
CPC ................ *H04B 1/7075* (2013.01)

(58) Field of Classification Search
CPC ....... G01S 19/39; G04R 20/02; H04B 1/7075; H04B 2201/70701; H04B 2201/70715
See application file for complete search history.

(56) References Cited

U.S. PATENT DOCUMENTS

| 6,128,332 A | 10/2000 | Fukawa et al. |
| 2009/0309791 A1 | 12/2009 | Chen |

FOREIGN PATENT DOCUMENTS

| WO | WO 00/67399 A1 | 11/2000 |
| WO | WO 02/088768 A2 | 11/2002 |
| WO | WO 2014/009409 A1 | 1/2014 |

OTHER PUBLICATIONS

International Search Report for PCT/EP2020/053581 dated Oct. 26, 2020.

(Continued)

*Primary Examiner* — Nader Bolourchi
(74) *Attorney, Agent, or Firm* — Knobbe, Martens, Olson & Bear, LLP

(57) ABSTRACT

A system and method of resolving a time ambiguity in a receiver based on a received radio signal. The radio signal includes a first signal component and a second signal component. The first and second signal components include code symbols having durations of time The system and method include acquiring each of the signal components, and performing code symbol synchronization and/or code synchronization for each of the codes. The system and method further include estimating a code phase offset between the synchronized codes, or a code-symbol phase offset between the synchronized code symbols. Finally, the system and method include resolving the time ambiguity of the receiver within a time period based on the time-dependent code phase offset or the time-dependent code-symbol phase offset.

17 Claims, 12 Drawing Sheets

(56) References Cited

OTHER PUBLICATIONS

Galileo SIS-ICD, European GNSS (Galileo) Open Service, Signal-In-Space Interface Control Document, Issue 2.0, Jan. 2021, pp. 13-19.
Kaplan, et al., "Understanding GPS—Principles and Applications", Artech House, Inc., 2nd Edition, 2006, pp. 571-574.

RADIO SIGNAL DEVICE AND METHOD FOR FAST TIME AMBIGUITY RESOLUTION

CROSS REFERENCE TO RELATED APPLICATIONS

This application is a U.S. National Phase Application of PCT International Application Number PCT/EP2020/053581, filed on Feb. 12, 2020, designating the United States of America and published in the English language. The disclosures of the above-referenced applications are hereby expressly incorporated by reference in their entireties.

FIELD OF THE INVENTION

The present invention relates to acquiring and resolving time information transmitted by a radio signal.

BACKGROUND OF THE INVENTION

Global Navigation Satellite Systems (GNSS) are one example of radio systems that rely heavily on accurate time information being transmitted from transmitter to receiver. Current GNSS systems rely on the transmission of signals disseminating time markers in the navigation message, e.g., the Time of Week (TOW) information, or secondary synchronization patterns (SSP), which may take several seconds to be received.

Hence, an improved radio signal transmitter and receiver would be advantageous, and in particular a radio system enabling a fast time ambiguity resolution would be advantageous.

OBJECT OF THE INVENTION

It is an object of the present invention to provide a radio signal device for transmitting a radio signal that enables fast time ambiguity resolution.

It is also an object of the present invention to provide a radio signal device for receiving the radio signal and performing the fast time ambiguity resolution.

It is a further object of the present invention to provide an alternative to the prior art.

SUMMARY OF THE INVENTION

Thus, the above-described object and several other objects are intended to be obtained in a first aspect of the invention by providing a radio signal device adapted for transmitting a radio signal. The radio signal comprises a first signal component and a second signal component. The first signal component comprises a first overlay code of $X_1$ first overlay code symbols modulated on a first primary code, the first overlay code having a first overlay code duration of $C_1$ units of time, wherein each of the first overlay code symbols has a duration of $S_1$ units of time. Likewise, the second signal component comprises a second overlay code of $X_2$ second overlay code symbols modulated on a second primary code, the second overlay code having a second overlay code duration of $C_2$ units of time, wherein each of the second overlay code symbols has a duration of $S_2$ units of time. Either, the overlay code duration $C_1$ of the first signal component and the overlay code duration $C_2$ of the second signal component are chosen such that the start or the end of the first overlay code and the second overlay code have a reference code phase offset of D units of time every 2N units of time, wherein 2N is equivalent to the least common multiple of $C_1$ and $C_2$. Or, the overlay code duration $C_1$ of the first signal component and the overlay code symbol duration $S_2$ of the second signal component are chosen such that the start or the end of the first overlay code and the second overlay code symbol have a reference code phase offset of D units of time every 2N units of time, wherein 2N is equivalent to the least common multiple of $C_1$ and $S_2$. With this device, the radio signal may be generated with a time-dependent code phase offset between the first signal component and the second signal component, or between the first signal component and the overlay code symbol of the second signal component. This time-dependent code phase offset may then be exploited by a receiver to enable a time ambiguity resolution within a time uncertainty of 2N units of time.

The above-described object and several other objects are also intended to be obtained in a second aspect of the invention by providing a radio signal device adapted for receiving a radio signal. The radio signal comprises a first signal component and a second signal component. The first signal component comprises a first overlay code of $X_1$ first overlay code symbols modulated on a first primary code, the first overlay code having a first overlay code duration of $C_1$ units of time, wherein each of the first overlay code symbols has a duration of $S_1$ units of time. Likewise, the second signal component comprises a second overlay code of $X_2$ second overlay code symbols modulated on a second primary code, the second overlay code having a second overlay code duration of $C_2$ units of time. Either, the overlay code duration $C_1$ of the first signal component and the overlay code duration $C_2$ of the second signal component are chosen such that the start or the end of the first overlay code and the second overlay code have a reference code phase offset of D units of time every 2N units of time, wherein 2N is equivalent to the least common multiple of $C_1$ and $C_2$. Or, the overlay code duration $C_1$ of the first signal component and the overlay code symbol duration $S_2$ of the second signal component are chosen such that the start or the end of the first overlay code and the second overlay code symbol have a reference code phase offset of D units of time every 2N units of time, wherein 2N is equivalent to the least common multiple of $C_1$ and $S_2$. The radio signal device is further adapted to register a code phase offset between the received first overlay code and either the second overlay code or the second overlay code symbol, and to resolve a time ambiguity within ±N units of time based on the code phase offset. In this way, the radio signal device is enabled to perform a fast resolution of the time ambiguity, by exploiting of the two overlay codes, or the first overlay code with the second overlay code symbol, with durations that cause the varying code phase offset between the first signal component and the second signal component.

In an embodiment, the reference code phase offset D is equal to zero.

In an embodiment, the first signal component and/or the second signal component are/is selected from the group of: a code-division multiple access, CDMA, signal/s; a time-division multiple access, TDMA, signal/s; and a frequency-division multiple access, FDMA, signal/s.

In an embodiment, the first signal component and second signal component are transmitted or received at a same carrier frequency and modulated on the same primary code.

In an embodiment, the first signal component and second signal component are transmitted or received at different carrier frequencies. In an embodiment of the invention, the primary codes of the first and/or second signal component are/is encrypted.

In an embodiment of the invention, the overlay codes of the first and/or second signal component are/is encrypted.

In an embodiment, the overlay code symbols of the first and/or second signal component are/is further modulated by a sequence of Y sub-symbols, wherein a duration of each sub-symbol is variable and time-dependent. This is equivalent to modulating a "variable transition phasing" (VTP) symbol in each overlay code symbol. Each overlay code symbol is in this case equivalent to a "VTP symbol". The VTP symbol within each overlay code symbol allows to modulate a Time of Interval, e.g, Time of Week (TOW), in one or few overlay code symbols. A receiver can retrieve the Time of Interval based only on the estimation of the sub-symbol transitions, equivalent to the retrieval of VTP symbol/s.

In an embodiment, the first and the second signal components are global navigation satellite system, GNSS, signals. Application of this technique is especially advantageous for GNSS use, as accurate time retrieval by a receiver is paramount for obtaining a position fix. Present systems require that the receiver awaits the next time-marker information, e.g. Time of Week (TOW) information, being transmitted from the satellite, which may take several seconds. In contrast, the present invention enables resolving accurate time information within hundreds of ms, e.g., 200 ms.

In an embodiment, one of the signal components are based on legacy signals being transmitted by current GNSS systems. In this way, the present invention is backwards compatible with the current legacy signals.

In a particular embodiment, the first and second signal components are transmitted by any satellite of the European Galileo system constellation.

Finally, the above-described object and several other objects are also intended to be obtained in a third aspect of the invention by providing a method of resolving a time ambiguity in a receiver based on a received radio signal. The radio signal comprises a first signal component and a second signal component. The first signal component comprises a first code of $X_1$ code symbols, the first code having a duration of $C_1$ units of time, wherein each of the code symbols has a duration of $S_1$ units of time. Likewise, the second signal component comprises a second code of $X_2$ code symbols, the second code having a duration of $C_2$ units of time, wherein each of the code symbols has a duration of $S_2$ units of time. Either, the code duration $C_1$ of the first signal component and the code duration $C_2$ of the second signal component are chosen such that the start or the end of the first code and the second code have a reference code phase offset of D units of time every 2N units of time, wherein 2N is equivalent to the least common multiple of $C_1$ and $C_2$. Or, the code duration $C_1$ of the first signal component and the code symbol duration $S_2$ of the second signal component are chosen such that the start or the end of the first code and the second code symbol have a reference code phase offset of D units of time every 2N units of time, wherein 2N is equivalent to the least common multiple of $C_1$ and $S_2$. The method comprises acquiring each of the first and second signal components, and performing code symbol synchronization and/or code synchronization for each of the first code and the second code. The method further comprises estimating a code phase offset between the synchronized first code and the synchronized second code, or a code-symbol phase offset between the synchronized first code and the synchronized second code symbol. Finally, the method comprises resolving the time ambiguity of the receiver within a ±N units of time period based on the time-dependent code phase offset or the time-dependent code-symbol phase offset. Using this method, a receiver is enabled to perform a fast resolution of the time ambiguity, by exploiting of the two codes, or the first code with the second code symbol, with different durations that cause the varying phase difference between the first signal component and the second signal component.

In a particular embodiment of the method, the first code is a first overlay code and/or the second code is a second overlay code.

In an embodiment of the method according to the invention, resolving the time ambiguity comprises looking up the estimated code phase offset or code-symbol phase offset in a pre-calculated look-up table. In this way, the code phase offset or the code-symbol phase offset may be used to resolve the time ambiguity in a fast and computationally efficient manner.

In an embodiment of the method according to the invention, the code symbols of the first or second signal component is further modulated by a sequence of Y sub-symbols. The duration of each sub-symbol is variable and time-dependent. The method comprises estimating a variable transition phasing of the sub-symbols of each code symbol of the first or second signal component. The method further comprises resolving the time ambiguity of the receiver within a ±KN units of time period, wherein K is a number of possible states that the Y sub-symbols can take.

In an embodiment of the method according to the invention, the variable transition phasing of the sub-symbols of multiple code symbols are estimated to extend the time ambiguity resolution of the receiver for the derivation of the Time of Week, Time of Day, or, in general, any Time of Interval. In an embodiment of the method according to the invention, the acquisition and code synchronization and/or code symbol synchronization of one of the first and second signal components is performed before the acquisition of the other signal component.

In an embodiment of the method according to the invention, one or more of the acquisition, code synchronization, and code symbol synchronization of one of the signal components is aiding the acquisition of the other signal component. In this way, one signal component may be exploited to ease the acquisition process for the other signal component.

In an embodiment, the first signal component and/or the second signal component are/is a code-division multiple access, CDMA, signal.

In an embodiment, the first signal component and/or the second signal component are/is a time-division multiple access, TDMA, signal/s.

In an embodiment, the first signal component and/or the second signal component are/is a frequency-division multiple access, FDMA, signal/s.

In an embodiment of the method according to the invention, the first signal component and second signal component are received in the same carrier frequency and modulated on the same primary code, requiring a single acquisition of the primary code.

In an alternative embodiment, the first signal component and second signal component are received at different and/or variable carrier frequencies.

In an embodiment of the method according to the invention, code synchronization or code symbol synchronization comprises detecting single or multiple code or code symbol transitions for the exploitation of time diversity.

In an embodiment of the method according to the invention, code synchronization or code symbol synchronization comprises detecting single or multiple code or code symbol transitions from one or multiple radio signals received from different transmitters for the exploitation of spatial diversity.

The individual aspects of the present invention may each be combined with any of the other aspects. These and other aspects of the invention will be apparent from the following description with reference to the described embodiments.

BRIEF DESCRIPTION OF THE FIGURES

The radio signal devices according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
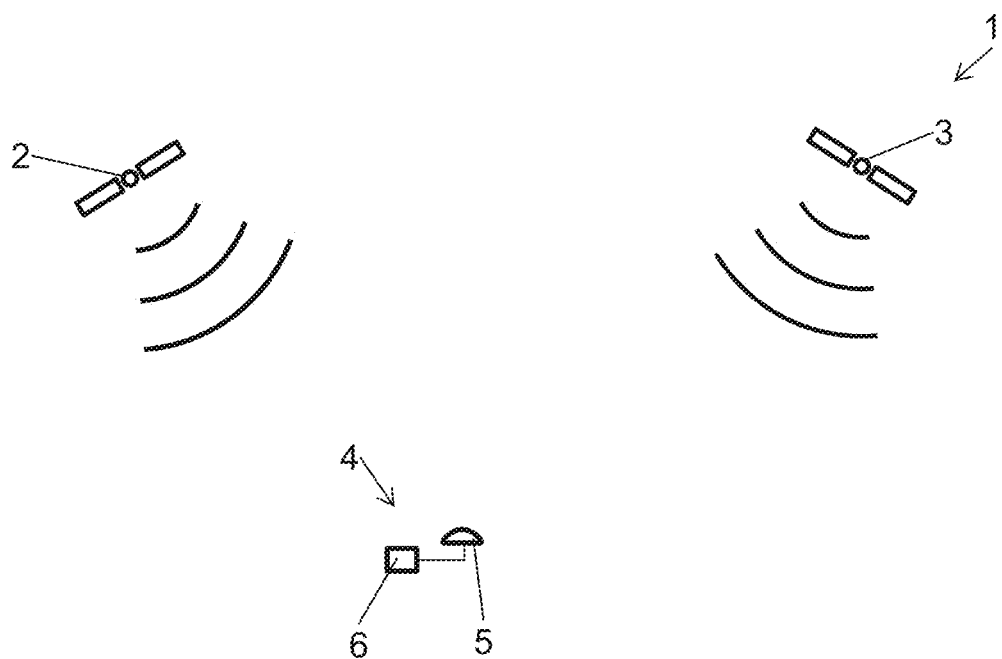
FIG. 1 schematically shows a radio system comprising radio signal devices.

FIG. 1 schematically illustrates a radio system 1, here in the form of a GNSS, comprising a first radio signal device 2 and a second radio signal device 3, both adapted for transmitting a radio signal (called transmitters in the following). The two transmitters 2, 3 are mounted on satellites in this case, but may in other types of radio system be e.g. terrestrial. The radio system 1 further comprises a third radio signal device 4 adapted for receiving the radio signal from the transmitters via an antenna 5, for further signal processing in a receiving unit 6. Each of the two transmitters are configured to transmit the radio signal comprising a first signal component and a second signal component. Each of the signal components comprise an overlay code, consisting of overlay code symbols modulated on a primary code.

In one embodiment of the invention, an overlay code duration of the first signal component and an overlay code duration of the second signal component are different and chosen such that the first overlay code and the second overlay code align in time every 2N units of time, where 2N is equivalent to the least common multiple of the overlay code durations.

In another embodiment of the invention, the overlay code duration of the first signal component and an overlay code symbol duration of the second signal component are different and chosen such that the first overlay code and the second overlay code symbol align in time every 2N units of time, where 2N is equivalent to the least common multiple of the overlay code durations.

The radio signal device 4 may exploit knowledge of this 2N time periodicity of a phase difference between the first overlay code and the second overlay code or second overlay code symbol to resolve the time ambiguity within the 2N units of time period.

Figure 2A:
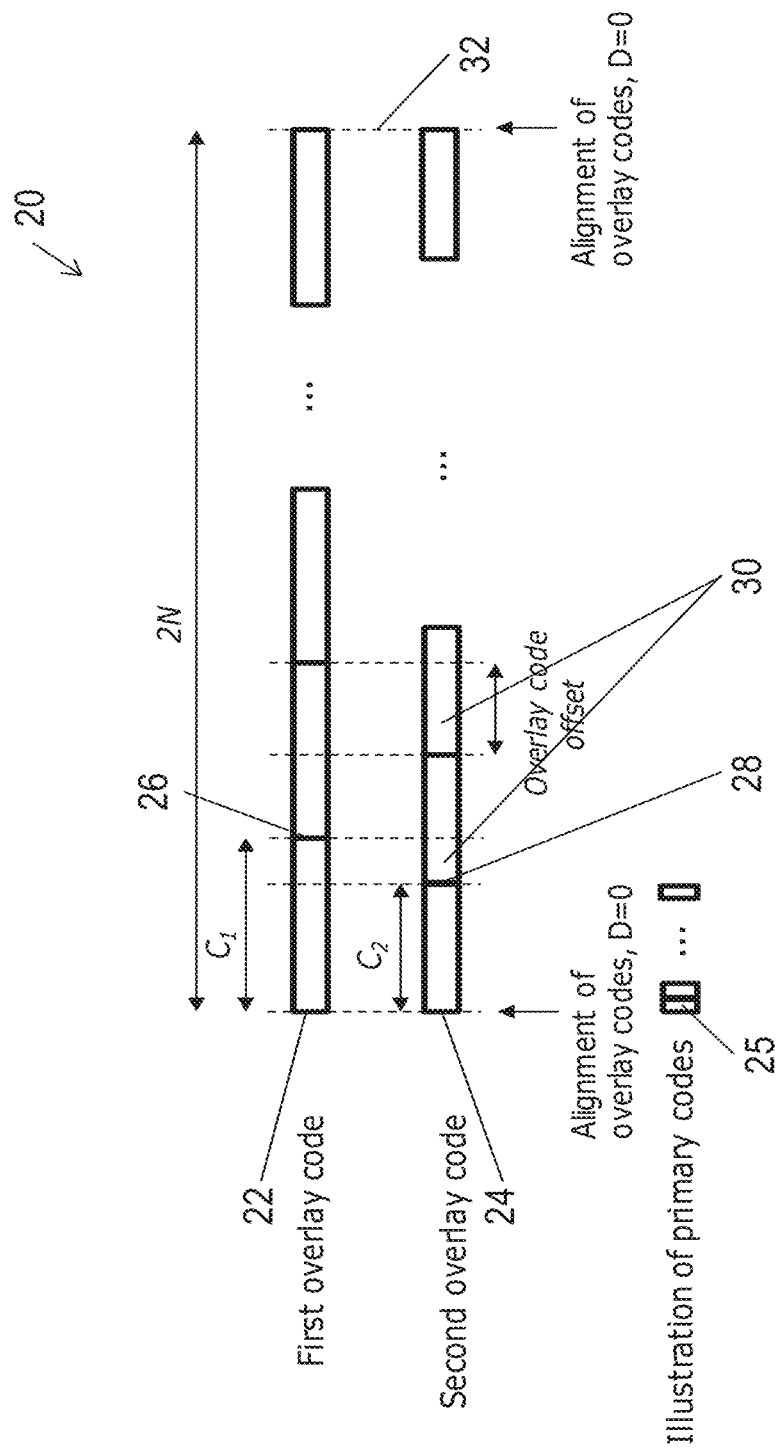
FIGS. 2a-2f illustrate overlay code phasing according to embodiments of the invention.
Figure 2B:
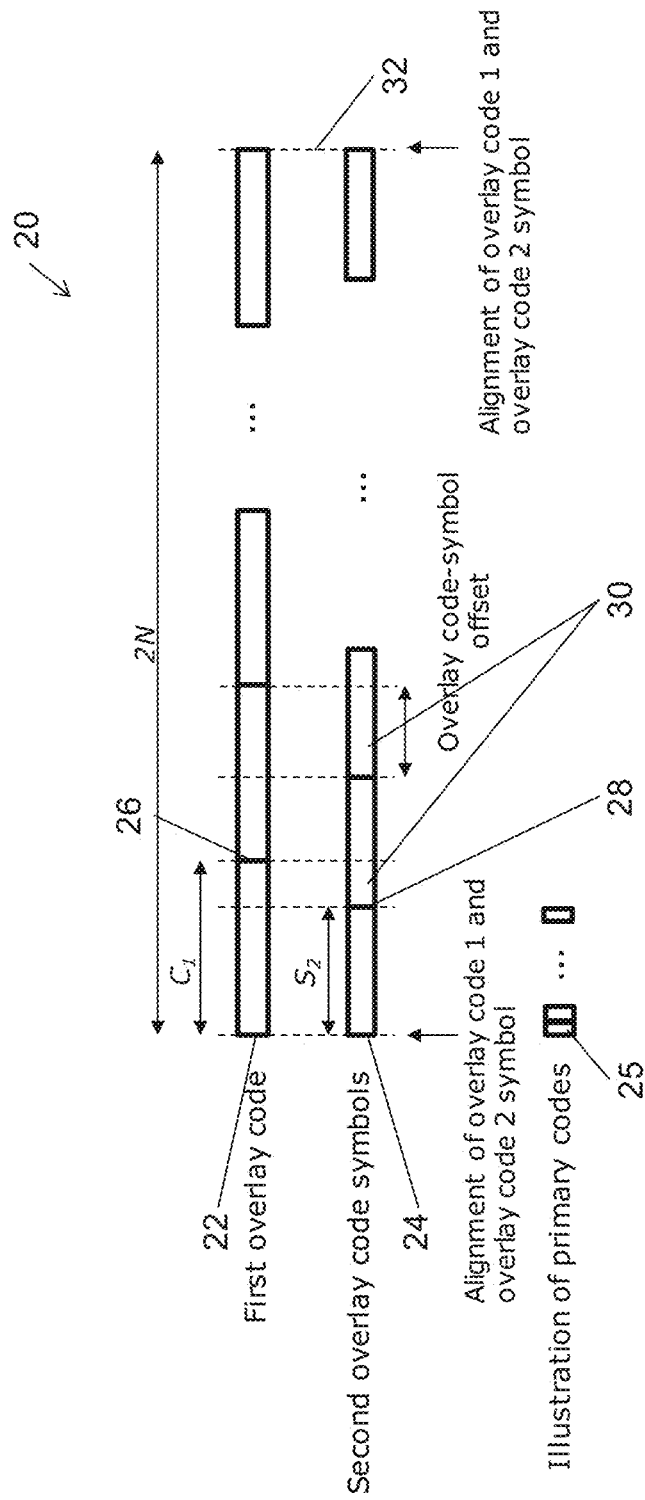

FIGS. 2a and 2b illustrate the overlay code phasing scheme 20 according to aspects of embodiments of the invention. Illustrated are two generic signals, each of them formed by a certain primary code and a certain overlay code, or specifically, the first overlay code 22 and the second overlay code 24 (FIG. 2a) or the second overlay code symbols (FIG. 2b) of the first and second signal components, respectively. The first overlay code 22 has an overlay code duration 26, here illustrated to be $C_1$ units of time. Analogously, the second overlay code 24 (FIG. 2a) or the second overlay code symbols 24 (FIG. 2b) have an overlay code duration 28, here illustrated to be $C_2$ or $S_2$ units of time, respectively. The reference code phase offset D is equal to zero in this example. A code phase offset is seen to evolve for each period of the overlay code durations, meaning that the code phase offset 30 will be different for each instance until the overlay codes align 32 after 2N units of time. Thus, the time within the 2N time period may be resolved directly from this code phase offset 30. Selection of suitable overlay codes enables tailoring the concept to allow a certain receiver time uncertainty.

Figure 2C:
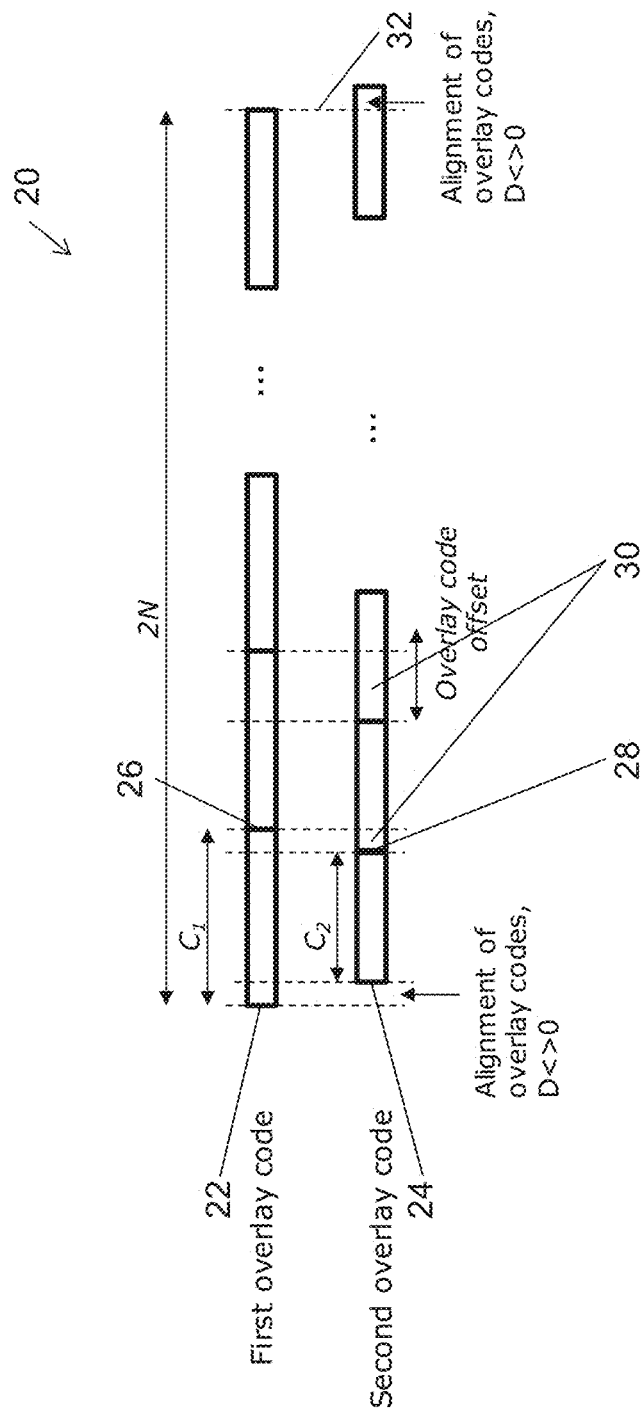

FIG. 2c illustrates the overlay code phasing scheme when the reference code phase offset D is an arbitrary value different from zero, according to another embodiment of the invention. This embodiment corresponds to those discussed for FIGS. 2a and 2b above, for which reason only the differences are discussed here. In this case, the first overlay code and the second overlay code have a code phase offset of D units of time every 2N units of time.

Figure 2D:
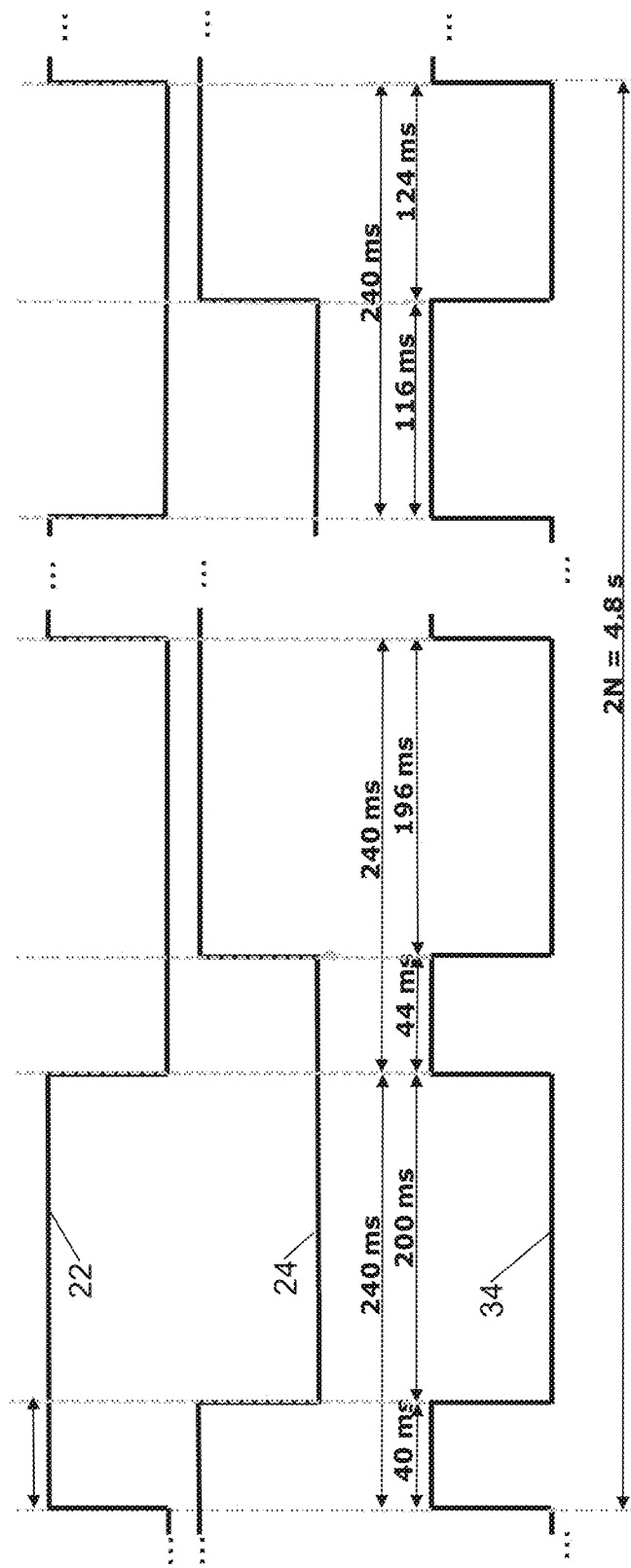

FIG. 2d illustrates the overlay code phasing scheme in the particular case in which the first overlay code 22 and the second overlay code 24 are transmitted in phase at the same carrier frequency and modulated on the same primary code, resulting in a composite overlay code 34, wherein the transitions of the resulting composite overlay code allow to resolve time within 2N units of time based on the estimation of the code phase offset between two consecutive transitions.

Figure 2E:
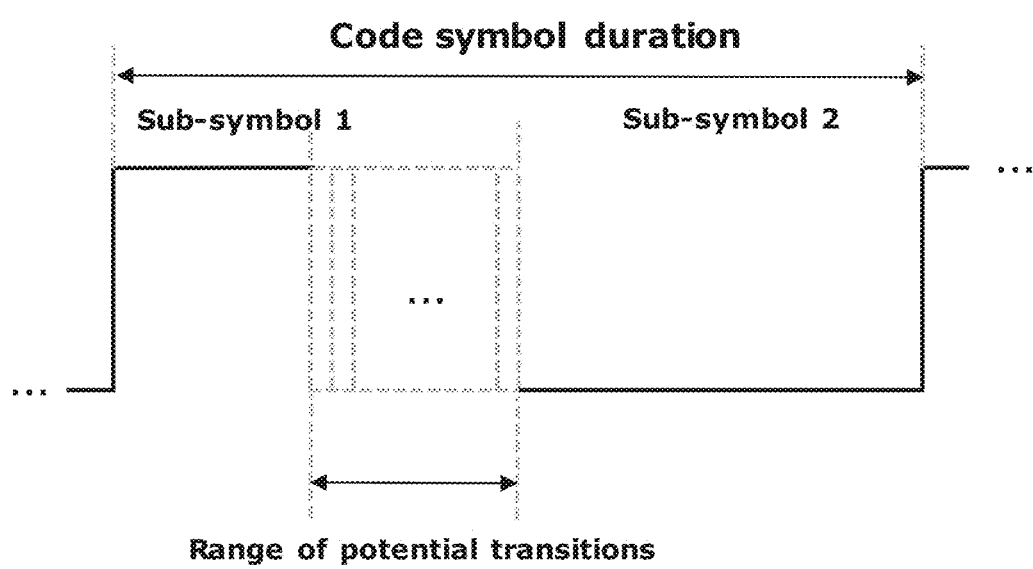

FIG. 2e illustrates a code symbol modulated by a variable transition phasing (VTP) scheme for the particular case of Y equal to 2 sub-symbols. The code symbol is in this case equivalent to a VTP symbol. The number of potential transitions that can take place is equal to the number of possible states K that can be transmitted within the VTP symbol.

Figure 2F:
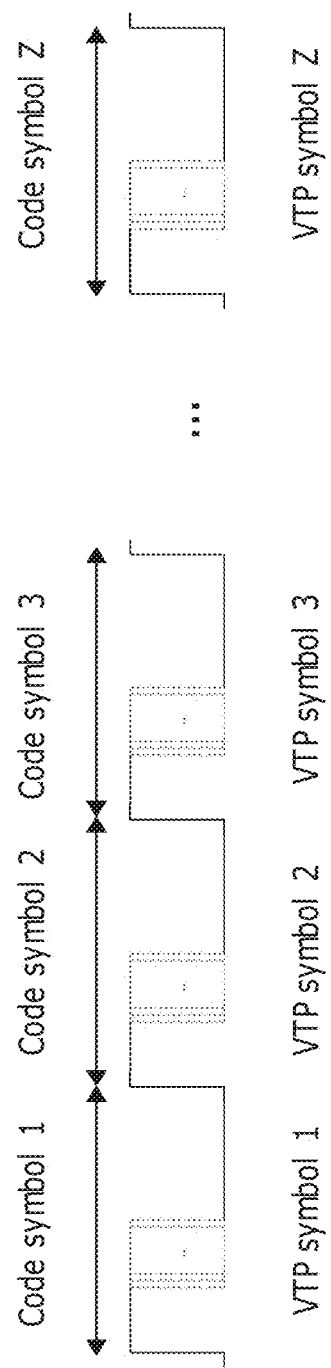

FIG. 2f illustrates the use of multiple consecutive VTP-modulated code symbols, i.e., multiple consecutive VTP symbols, each formed by 2 sub-symbols, for the dissemination of the Time of Interval, e.g., the Time of Week (TOW), based on the K possible states for each of the VTP symbols.

Figure 3A:
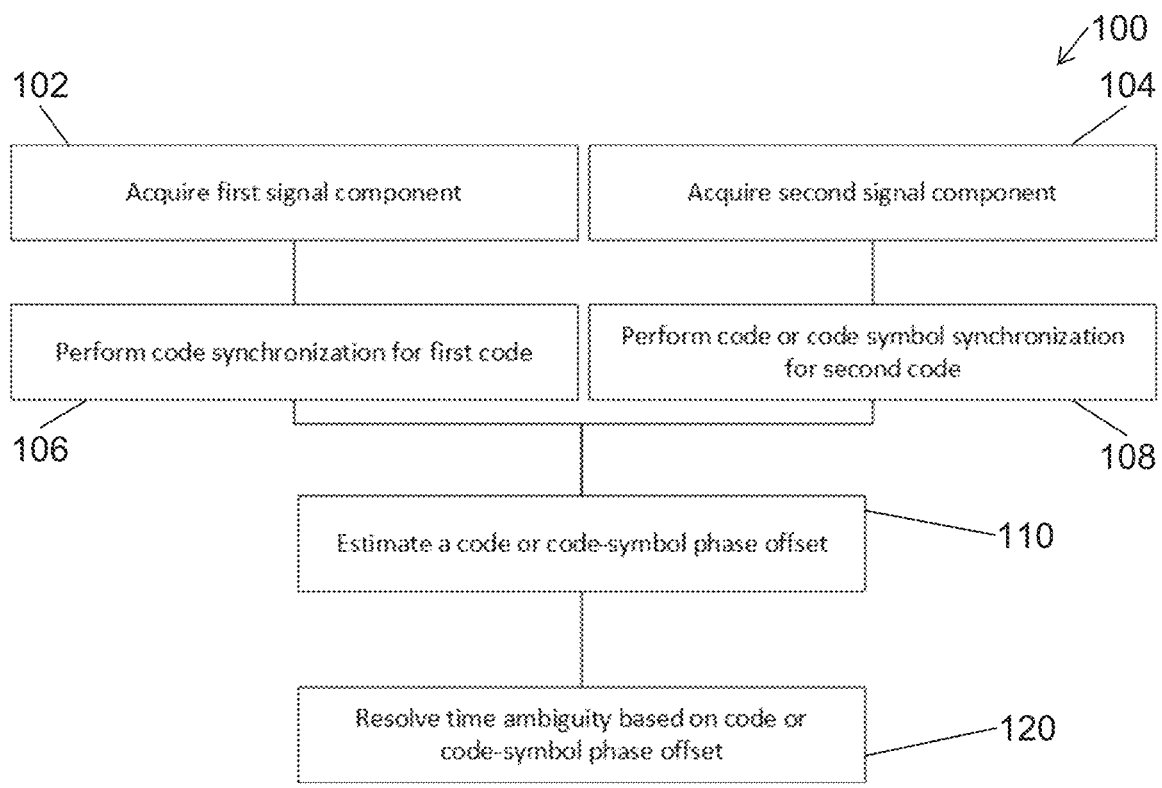
FIGS. 3a and 3b are flow charts of the method according to the invention.

FIG. 3a is a flow chart of the method 100 of resolving time ambiguity in a receiver based on a received radio signal according to the invention. As also described above, the radio signal comprises a first signal component and a second signal component. The radio signal is described above for both FIGS. 1 and 2, and is therefore not described here in detail. The method firstly comprises acquiring both the first signal component 102 and the second signal component 104. After acquiring the first signal component, code synchronization 106 is performed. Likewise, after acquiring the second signal component, code synchronization and/or code symbol synchronization 108 is performed. According to one embodiment of the method, acquisition 102 and/or code synchronization 106 is performed on the first signal component, before acquisition 104 of the second signal component. In this case, acquisition 104 of the second signal component may be aided by the acquired or synchronized first signal component/code. Alternatively, acquisition of the first and second signal components may be performed in parallel, before performing synchronization on the codes/ code symbols. After synchronization of the first code 106 and second code/code symbol 108, a code or code-symbol phase offset 110 is estimated from the synchronized first code and the synchronized second code or the synchronized second code symbol. Finally, the estimated code phase offset or code-symbol phase offset 120 is used to resolve the time ambiguity of the receiver. Resolving the time ambiguity may for instance be performed by looking up the estimated code or code-symbol phase offset in a precalculated look-up table. Alternatively, the time ambiguity may be calculated directly from the phase offset.

Figure 3B:
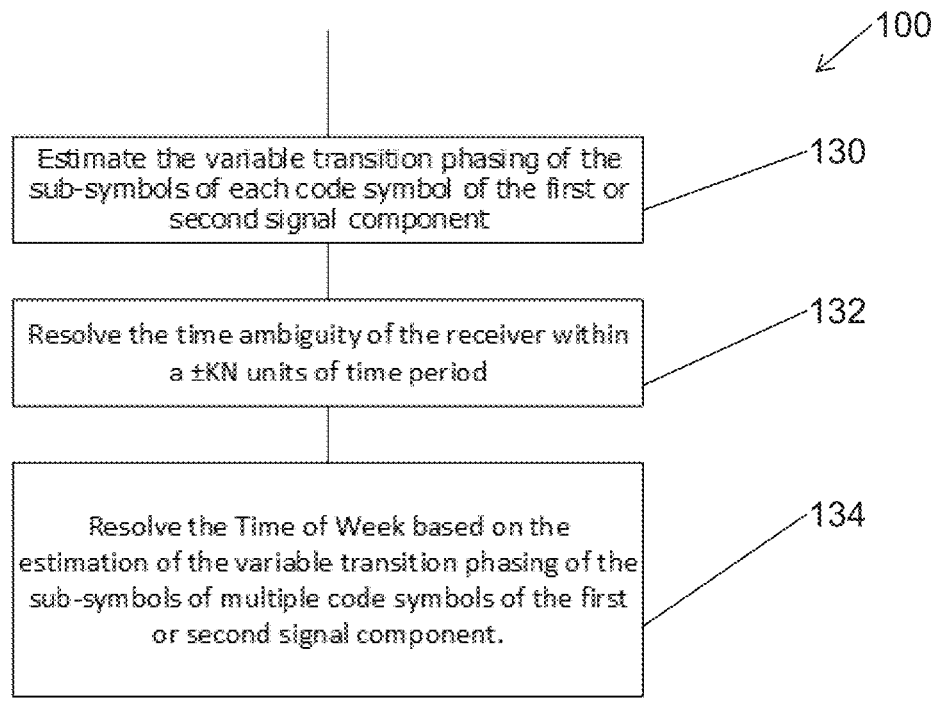

FIG. 3b is a flow chart of resolving the Time of Week (TOW) based on the estimation of the variable transition phasing of the sub-symbols of each code symbol (i.e., each VTP symbol), with one VTP symbol taking one of the K possible states, when multiple VTP symbols are used (considering that the time ambiguity resolution within ±KN units of time does not cover a full week). The method flow of this figure succeeds that of FIG. 3a, i.e. step 130 follows step 120.

Figure 4A:
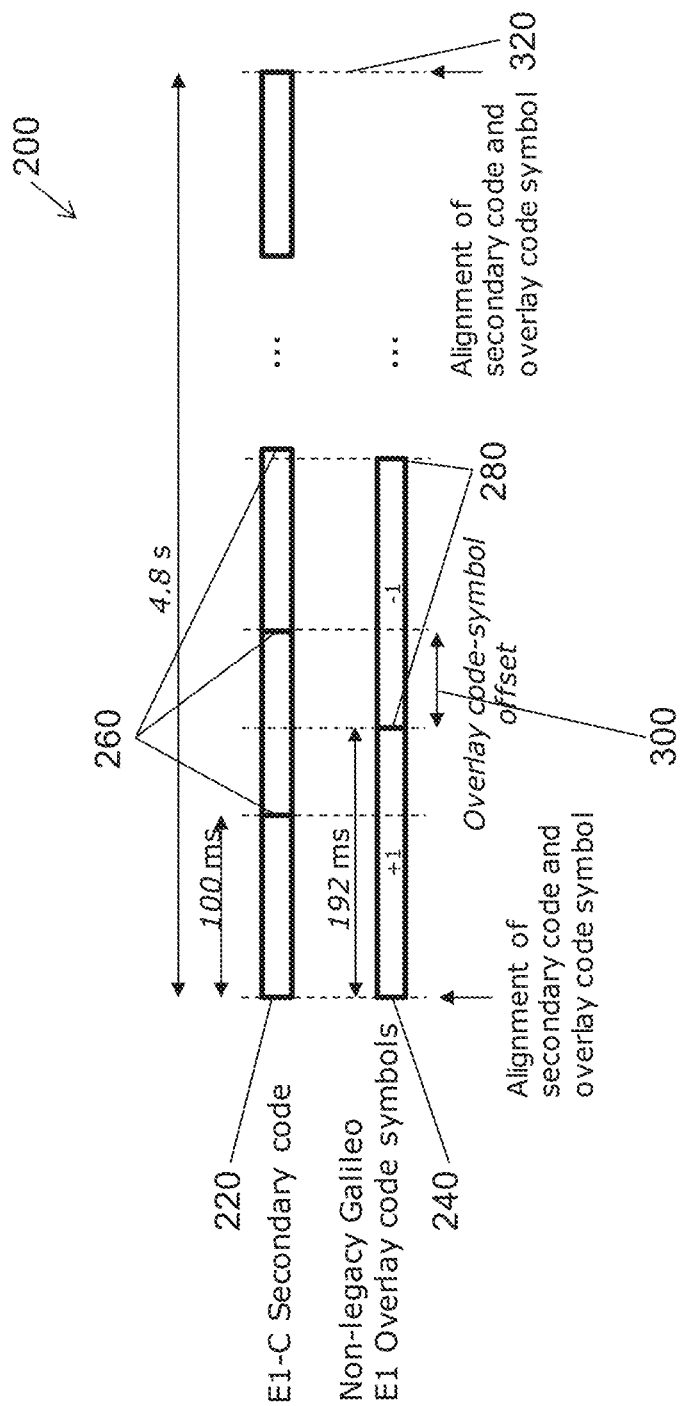
FIGS. 4a, 4b and 4c illustrate examples of the invention.

FIG. 4a illustrates an example 200 of the invention, as applied to the European Galileo GNSS E1. Specifically, this example relies on a legacy Galileo signal 220 as one of the two signal components, e.g. an E1-C secondary code, and further including this new feature in a non-legacy (Galileo) signal 240 with the overlay code. For this example, the target is to provide fast time ambiguity resolution, with a latency below 1 second to coarse time assisted receivers with a time uncertainty of around ±2 seconds, as typically expected for connected users (for instance location based services (LBS) or internet of things (IOT) use cases). Here, a non-legacy Galileo E1 signal is considered. This signal contains a slow overlay code 240 composed by the sequence {+1, −1}, with the duration 280 of the overlay symbols equal to 192 ms (i.e., the total duration of the overlay code is 384 ms). This makes the E1-C secondary code 220 and the overlay code symbols 240 to be aligned every 4.8 seconds, enabling resolving the time ambiguity for receivers with a time uncertainty below ±2.4 seconds. This allows to resolve the time ambiguity with a latency below 192 ms (for single transition detection approach) based on the "bit" synchronization for the overlay code (i.e., overlay symbol synchronization) of the non-legacy E1 signal, and the secondary code synchronization of E1-C. Moreover, this allows the exploitation of long coherent integration times in acquisition by the receiver when the non-legacy E1 signal is used for that purpose (as well as lower losses introduced by the transitions in the acquisition sensitivity, even if short coherent integration times are exploited). It is noted that the same can be done for e.g. Galileo E5 signals, in which case the E5a/b-Q signals could be used.

Figure 4B:
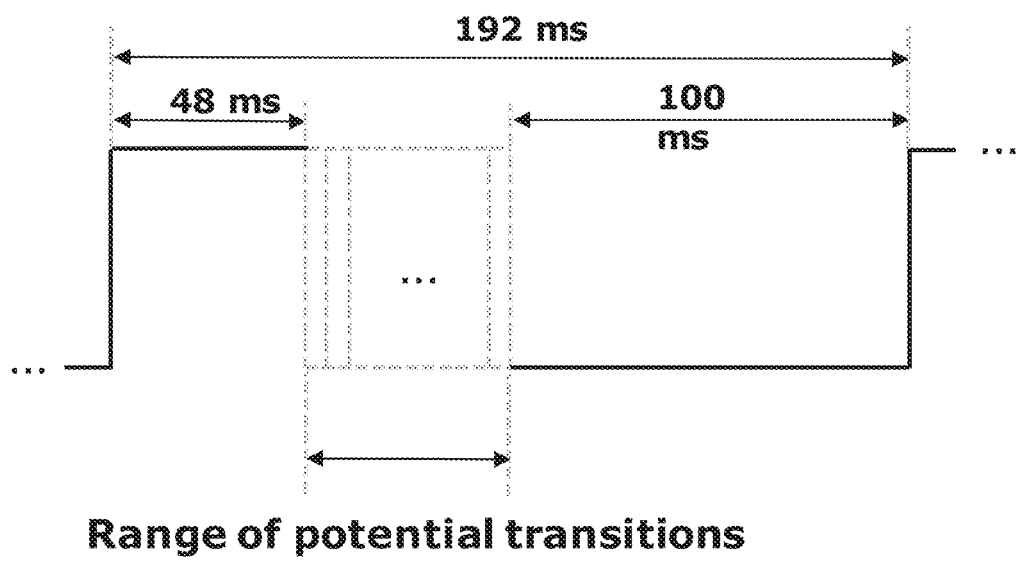

FIG. 4b illustrates an example of a VTP-modulated code symbol (i.e., a VTP symbol) when the number of possible states K is equal to 12, such that the transition of the VTP symbol can take place in one of the 12 possible transition locations.

Figure 4C:
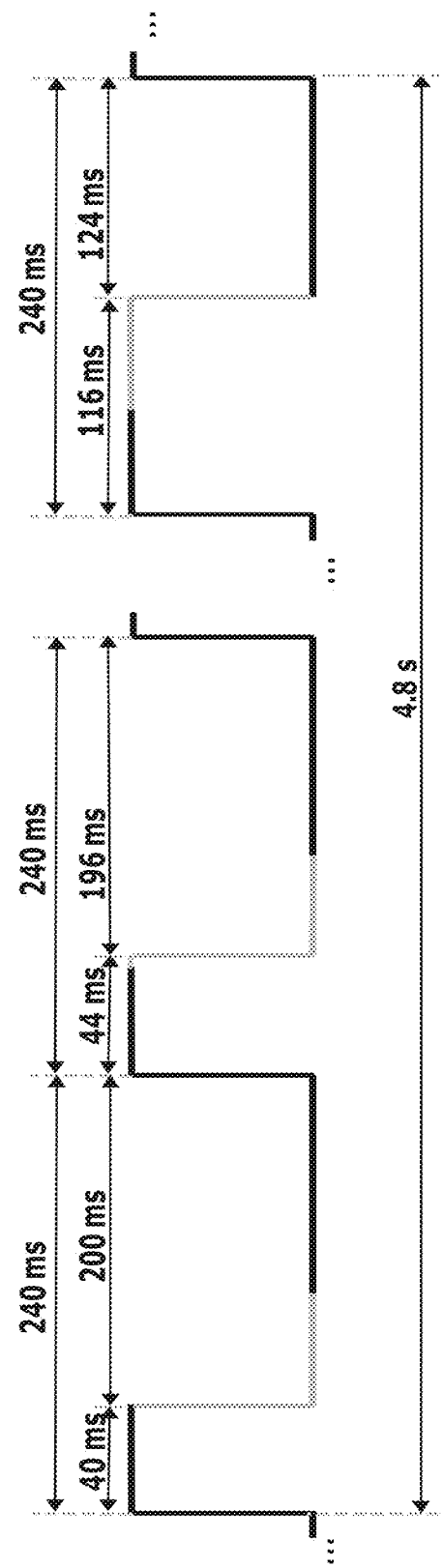

FIG. 4c illustrates an example of the invention for a non-legacy signal with a composite overlay code obtained from the combination of two overlay codes transmitted in phase at the same frequency and modulated on the same primary code. This resulting composite overlay code allows to resolve time within 250 ms for receivers with a time uncertainty below ±2.4 seconds.

Figure 5:
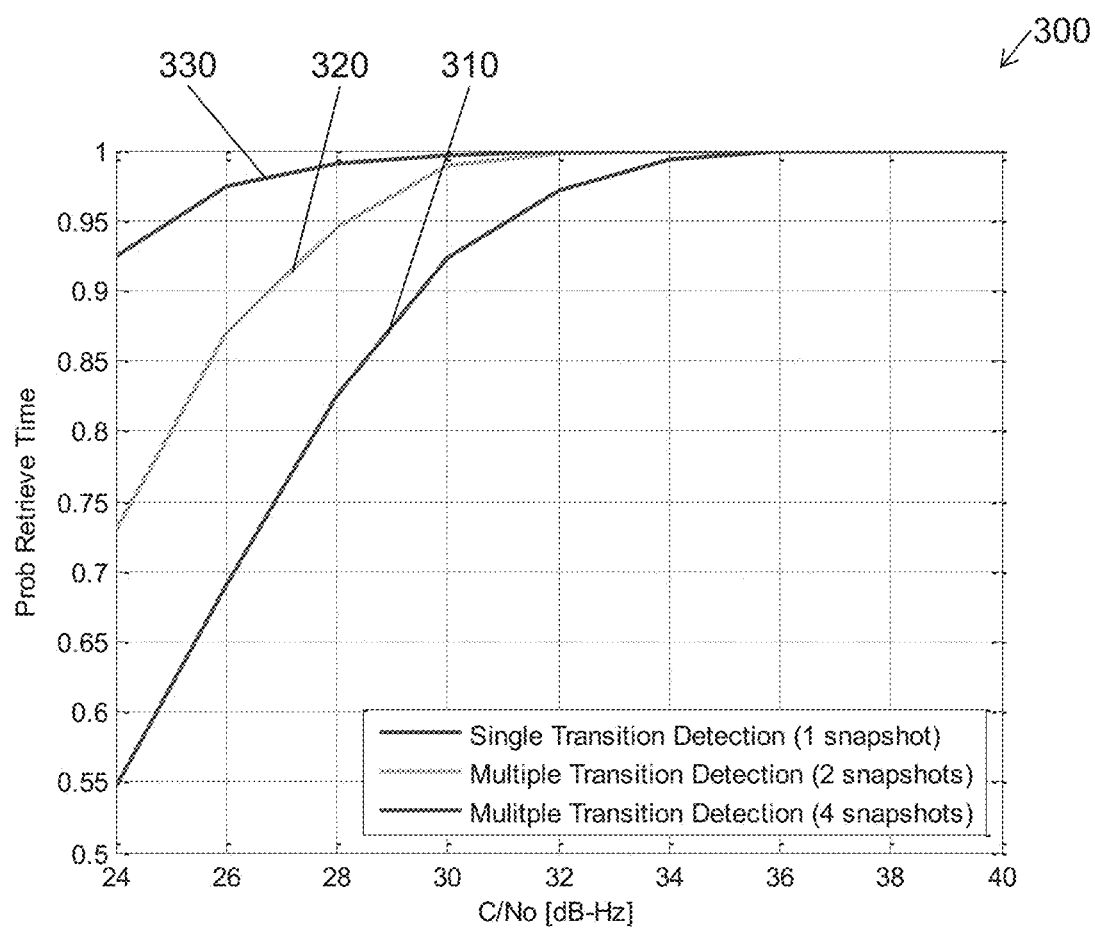
FIG. 5 shows calculation results according to the example of the invention.

FIG. 5 shows calculation results 300 according to the example of the invention as illustrated in FIG. 4a. Specifically, the figure shows the probability to resolve the time ambiguity in this configuration for the case of single transition detection 310 and multiple transition detection: 2 snapshots 320, and 4 snapshots 330 (improving the detection probability at the cost of higher latency, of interest in certain environment conditions). This configuration allows fast retrieval with a latency below 192 ms, as mentioned earlier. This is considerably lower than current values achieved for Galileo E1-B SSP (latency below 3 seconds for time uncertainty of +3 seconds) and GPS L1 C/A (TOW every 6 seconds). Moreover, it allows an easy adaptation to the working point targeted by the GNSS receiver (trade-off sensitivity vs. latency).

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A radio signal device configured to transmit a radio signal, the radio signal comprising a first signal component and a second signal component, wherein:
    the first signal component comprises a first overlay code of $X_1$ first overlay code symbols modulated on a first primary code, the first overlay code having a first overlay code duration of $C_1$ units of time, wherein each of the first overlay code symbols have a duration of $S_1$ units of time, and
    the second signal component comprises a second overlay code of $X_2$ second overlay code symbols modulated on a second primary code, the second overlay code having a second overlay code duration of $C_2$ units of time, wherein each of the second overlay code symbols has a duration of $S_2$ units of time, wherein either
    the overlay code duration $C_1$ of the first signal component and the overlay code duration $C_2$ of the second signal component are chosen such that the start or the end of the first overlay code and the second overlay code have a reference code phase offset of D units of time every 2N units of time, wherein 2N is an integer and equivalent to the least common multiple of $C_1$ and $C_2$, or
    the overlay code duration $C_1$ of the first signal component and the overlay code symbol duration $S_2$ of the second signal component are chosen such that the start or the end of the first overlay code and the second overlay code symbol have a reference code phase offset of D units of time every 2N units of time, wherein 2N is an integer and equivalent to the least common multiple of $C_1$ and $S_2$.

2. The radio signal device according to claim 1, wherein the reference code phase offset D is equal to zero.

3. The radio signal device according to claim 1, wherein the first signal component and/or the second signal component are/is selected from a code-division multiple access, CDMA, signal/s; a time-division multiple access, TDMA, signal/s; or a frequency-division multiple access, FDMA, signal/s.

4. The radio signal device according to claim 1, wherein the first signal component and second signal component are transmitted or received at a same carrier frequency.

5. The radio signal device according to claim 1, wherein the first signal component and second signal component are transmitted or received at different carrier frequencies.

6. The radio signal device according to claim 1, wherein the overlay code symbols of the first and/or second signal component are/is further modulated by a sequence of Y sub-symbols, wherein a duration of each sub-symbol is variable and time-dependent.

7. The radio signal device according to claim 1, wherein the first and the second signal components are global navigation satellite system, GNSS, signals.

8. The radio signal device according to claim 7, wherein one of the signal components are based on legacy signals being transmitted by current GNSS systems.

9. A radio signal device configured to receive a radio signal, the radio signal comprising a first signal component and a second signal component, wherein:
the first signal component comprises a first overlay code of $X_1$ first overlay code symbols modulated on a first primary code, the first overlay code having a first overlay code duration of $C_1$ units of time, wherein each of the first overlay code symbols have a duration of $S_1$ units of time, and
the second signal component comprises a second overlay code of $X_2$ second overlay code symbols modulated on a second primary code, the second overlay code having a second overlay code duration of $C_2$ units of time, wherein either
the overlay code duration $C_1$ of the first signal component and the overlay code duration $C_2$ of the second signal component are chosen such that the start or the end of the first overlay code and the second overlay code have a reference code phase offset of D units of time every 2N units of time, wherein 2N is an integer and equivalent to the least common multiple of $C_1$ and $C_2$, or
the overlay code duration $C_1$ of the first signal component and the overlay code symbol duration $S_2$ of the second signal component are chosen such that the start or the end of the first overlay code and the second overlay code symbol have a reference code phase offset of D units of time every 2N units of time, wherein 2N is an integer and equivalent to the least common multiple of $C_1$ and $S_2$,
the radio signal device further being configured to:
register a code phase offset between the received first overlay code and either the second overlay code or the second overlay code symbol, and to
resolve a time ambiguity within ±N units of time based on the code phase offset.

10. A method of resolving a time ambiguity in a receiver based on a received radio signal, the radio signal comprising a first signal component and a second signal component, wherein:
the first signal component comprises a first code of $X_1$ code symbols, the first code having a duration of $C_1$ units of time, wherein each of the code symbols has a duration of $S_1$ units of time, and
the second signal component comprises a second code of $X_2$ code symbols, the second code having a duration of $C_2$ units of time, wherein each of the code symbols has a duration of $S_2$ units of time, wherein either
the code duration $C_1$ of the first signal component and the code duration $C_2$ of the second signal component are chosen such that the start or the end of the first code and the second code have a reference code phase offset of D units of time every 2N units of time, wherein 2N an integer and is equivalent to the least common multiple of $C_1$ and $C_2$, or
the code duration $C_1$ of the first signal component and the code symbol duration $S_2$ of the second signal component are chosen such that the start or the end of the first code and the second code symbol have a reference code phase offset of D units of time every 2N units of time, wherein 2N is an integer and equivalent to the least common multiple of $C_1$ and $S_2$, the method comprises:
acquiring each of the first and second signal components,
performing code symbol synchronization and/or code synchronization for each of the first code and the second code,
estimating a code phase offset between the synchronized first code and the synchronized second code, or a code-symbol phase offset between the synchronized first code and the synchronized second code symbol, and
resolving the time ambiguity of the receiver within a ±N units of time period based on the time-dependent code phase offset or the time-dependent code-symbol phase offset.

11. The method according to claim 10, wherein resolving the time ambiguity comprises identifying the estimated code phase offset or code-symbol phase offset in a pre-calculated table.

12. The method according to claim 10, wherein the code symbols of the first or second signal component is further modulated by a sequence of Y sub-symbols, wherein the duration of each sub-symbol is variable and time-dependent, the method comprises:
estimating a variable transition phasing of the sub-symbols of each code symbol of the first or second signal component, and
resolving the time ambiguity of the receiver within a ±KN units of time period, wherein K is a number of possible states that the Y sub-symbols can take.

13. The method according to claim 12, wherein the variable transition phasing of the sub-symbols of multiple code symbols are estimated to extend the time ambiguity resolution of the receiver for the derivation of the Time of Week, Time of Day, or any Time of Interval.

14. The method according to claim 10, wherein one or more of the acquisition, code synchronization, or code symbol synchronization of one of the signal components contributes to the acquisition of the other signal component.

15. The method according to claim 10, wherein the first signal component and second signal component are received in the same carrier frequency and modulated on the same primary code, requiring a single acquisition of the primary code.

16. The method according to claim 10, wherein code synchronization or code symbol synchronization comprises detecting single or multiple code or code symbol transitions for the exploitation of time diversity.

17. The method according to any claim 10, wherein code synchronization or code symbol synchronization comprises detecting single or multiple code or code symbol transitions from one or multiple radio signals received from different transmitters for the exploitation of spatial diversity.

* * * * *